(12) United States Patent
Sun et al.

(10) Patent No.: US 10,075,108 B2
(45) Date of Patent: Sep. 11, 2018

(54) INTEGRATED CIRCUIT, MOTOR COMPONENT AND APPLICATION DEVICE HAVING THE MOTOR COMPONENT

(71) Applicant: Johnson Electric S.A., Murten (CH)

(72) Inventors: Chi Ping Sun, Hong Kong (CN); Ken Wong, Hong Kong (CN); Shing Hin Yeung, Hong Kong (CN); Shu Juan Huang, Shen Zhen (CN); Yun Long Jiang, Shen Zhen (CN); Gang Qian, Hong Kong (CN); Yue Li, Hong Kong (CN); Bao Ting Liu, Shen Zhen (CN); En Hui Wang, Shen Zhen (CN); Fei Xin, Shen Zhen (CN); Xiu Wen Yang, Shen Zhen (CN); Li Sheng Liu, Shen Zhen (CN); Yan Yun Cui, Shen Zhen (CN)

(73) Assignee: Johnson Electric S.A., Murten (CH)

( * ) Notice: Subject to any disclaimer, the term of this patent is extended or adjusted under 35 U.S.C. 154(b) by 47 days.

(21) Appl. No.: 15/230,931

(22) Filed: Aug. 8, 2016

(65) Prior Publication Data

US 2016/0344316 A1 Nov. 24, 2016

Related U.S. Application Data

(63) Continuation-in-part of application No. 14/822,353, filed on Aug. 10, 2015, now Pat. No. 9,755,555, and
(Continued)

(30) Foreign Application Priority Data

Aug. 8, 2014 (CN) .......................... 2014 1 0390592
Aug. 15, 2014 (CN) .......................... 2014 1 0404474
Jun. 2, 2016 (CN) .......................... 2016 1 0390067

(51) Int. Cl.
*H02P 6/16* (2016.01)
*H02P 6/20* (2016.01)
(Continued)

(52) U.S. Cl.
CPC .............. *H02P 6/16* (2013.01); *H02K 11/215* (2016.01); *H02P 6/20* (2013.01); *H02P 6/30* (2016.02);
(Continued)

(58) Field of Classification Search
CPC ........................................................ H02P 6/16
(Continued)

(56) References Cited

U.S. PATENT DOCUMENTS 5,285,104 A * 2/1994 Kondo ................ H01L 23/4334
257/666
5,675,226 A 10/1997 Riola'
(Continued)

FOREIGN PATENT DOCUMENTS

CN 201409107 Y 2/2010
CN 201590796 U 9/2010
(Continued)

*Primary Examiner* — David S Luo
(74) *Attorney, Agent, or Firm* — Muncy, Geissler, Olds & Lowe, P.C.

(57) ABSTRACT

An integrated circuit, a motor component including the integrated circuit and an application device having the motor component are provided according to embodiments of the present disclosure. The integrated circuit includes a housing, an integrated circuit die arranged inside the housing and multiple pins extended out from the housing. The integrated circuit die has a conductive back plate and an electronic circuit arranged on the conductive back plate. The multiple pins include an input pin and an output pin, each of the multiple pins has a lead frame inside the housing. And the conductive back plate is fixed to the lead frame of at least
(Continued)

one ungrounded pin of the multiple pins in a manner of electrical insulation, thereby avoiding an short circuit for the integrated circuit due to an electrical connection between the conductive back plate and the lead frame fixed to the conductive back plate.

17 Claims, 12 Drawing Sheets

Related U.S. Application Data a continuation-in-part of application No. PCT/CN2015/086422, filed on Aug. 7, 2015.

(51) Int. Cl.
| | |
|---|---|
| *H02K 11/215* | (2016.01) |
| *H02P 7/295* | (2016.01) |
| *H02P 6/30* | (2016.01) |
| *H02P 7/03* | (2016.01) |

(52) U.S. Cl.
CPC ............ *H02P 7/05* (2016.02); *H02P 7/295* (2013.01); *H02P 2207/05* (2013.01)

(58) Field of Classification Search
USPC .............................. 318/400.26, 400.01, 700
See application file for complete search history.

(56) References Cited

U.S. PATENT DOCUMENTS

| | | | | |
|---|---|---|---|---|
| 6,358,778 B1 * | 3/2002 | Shinohara | ........... | H01L 21/4832 438/123 |
| 7,612,510 B2 * | 11/2009 | Koehl | ................ | F04D 15/0088 318/254.1 |
| 8,786,227 B2 * | 7/2014 | Kubo | ................... | B60H 1/3213 310/16 |

FOREIGN PATENT DOCUMENTS

| | | |
|---|---|---|
| CN | 102075130 A | 5/2011 |
| DE | 102006055482 A1 | 6/2008 |

* cited by examiner

US 10,075,108 B2

INTEGRATED CIRCUIT, MOTOR COMPONENT AND APPLICATION DEVICE HAVING THE MOTOR COMPONENT

CROSS REFERENCE TO RELATED APPLICATIONS

This application is a continuation-in-part of co-pending U.S. patent application Ser. No. 14/822,353, filed on Aug. 10, 2015, which claims priority under 35 U.S.C. § 119(a) from Patent Application No. 201410390592.2 filed in the People's Republic of China on Aug. 8, 2014, and Patent Application No. 201410404474.2 filed in the People's Republic of China on Aug. 15, 2014; this application claims priority under 35 U.S.C. § 119(a) from Patent Application No. 201610390067.X filed in the People's Republic of China on Jun. 2, 2016, Patent Application No. PCTCN2015086422 as PCT application filed in Receiving Office of CN on Aug. 7, 2015, all of which are expressly incorporated herein by reference in their entireties and for all purposes.

FIELD

The disclosure relates to the field of magnetic field detection technology, and in particular to an integrated circuit, a motor component including the integrated circuit and an application device having the motor component.

BACKGROUND

During starting of a synchronous motor, the stator produces an alternating magnetic field causing the permanent magnetic rotor to be oscillated. The amplitude of the oscillation of the rotor increases until the rotor begins to rotate, and finally the rotor is accelerated to rotate in synchronism with the alternating magnetic field of the stator. To ensure the starting of a conventional synchronous motor, a starting point of the motor is set to be low, which results in that the motor cannot operate at a relatively high working point, thus the efficiency is low. In another aspect, the rotor cannot be ensured to rotate in a same direction every time since a stop or stationary position of the permanent magnetic rotor is not fixed. Accordingly, in applications such as a fan and water pump, the impeller driven by the rotor has straight radial vanes, which results in a low operational efficiency of the fan and water pump.

FIG. 1 illustrates a conventional drive circuit for a synchronous motor, which allows a rotor to rotate in a same predetermined direction in every time it starts. In the circuit, a stator winding 1 of the motor is connected in series with a TRIAC between two terminals M and N of an AC power source VM, and an AC power source VM is converted by a conversion circuit DC into a direct current voltage and the direct current is supplied to a position sensor H. A magnetic pole position of a rotor in the motor is detected by the position sensor H, and an output signal Vh of the position sensor H is connected to a switch control circuit PC to control the bidirectional thyristor T.

FIG. 2 illustrates a waveform of the drive circuit. It can be seen from FIG. 2 that, in the drive circuit, no matter the bidirectional thyristor T is switched on or off, the AC power source supplies power for the conversion circuit DC so that the conversion circuit DC constantly outputs and supplies power for the position sensor H (referring to a signal VH in FIG. 2). In a low-power application, in a case that the AC power source is commercial electricity of about 200V, the electric energy consumed by two resistors R2 and R3 in the conversion circuit DC is more than the electric energy consumed by the motor.

The magnetic sensor applies Hall effect, in which, when current I runs through a substance and a magnetic field B is applied in a positive angle with respect to the current I, a potential difference V is generated in a direction perpendicular to the direction of current I and the direction of the magnetic field B. The magnetic sensor is often implemented to detect the magnetic polarity of an electric rotor.

As the circuit design and signal processing technology advances, there is a need to improve the magnetic sensor integrated circuit for the ease of use and accurate detection.

BRIEF DESCRIPTION OF THE DRAWINGS

The drawings to be used in the description of embodiments of the disclosure or the conventional technology are described briefly as follows, so that technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

Technical solutions according to embodiments of the present disclosure are described clearly and completely in conjunction with the drawings in the embodiments of the present disclosure hereinafter. Apparently, the described embodiments are only a few rather than all of the embodiments of the present disclosure. Other embodiments obtained by those skilled in the art without any creative work based on the embodiments of the present disclosure fall into the protection scope of the present disclosure.

More specific details are set forth in the following descriptions for sufficient understanding of the disclosure, but the present disclosure may further be implemented by other ways different from the way described herein. Similar extensions can be made by those skilled in the art without departing from the spirit of the present disclosure, and therefore, the present disclosure is not limited to particular embodiments disclosed hereinafter.

Figure 1:
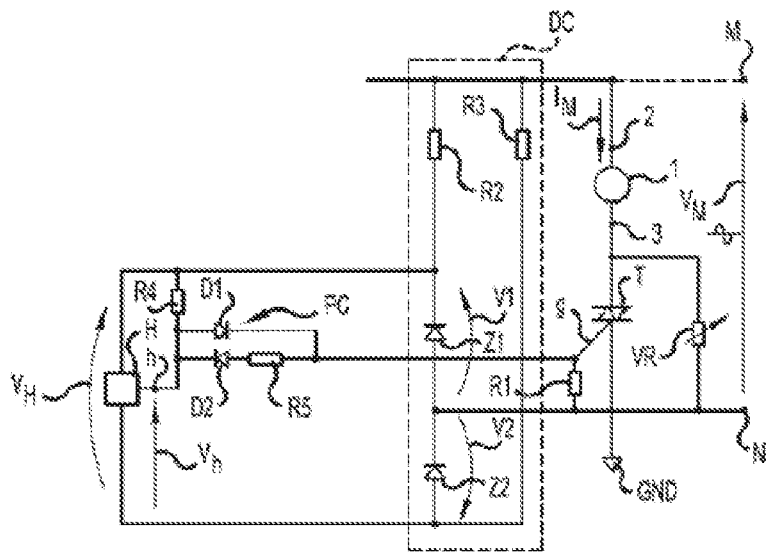
FIG. 1 illustrates a prior art drive circuit for a synchronous motor, according to an embodiment of the present disclosure.
Figure 2:
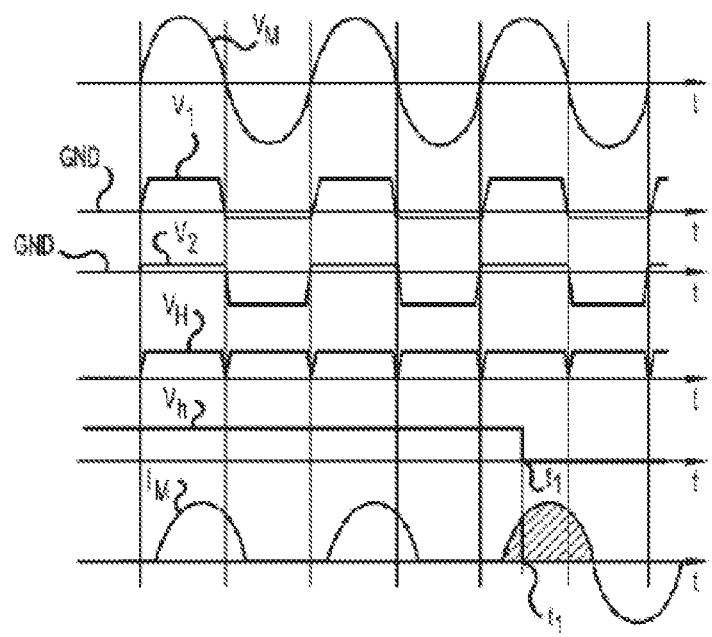
FIG. 2 illustrates a waveform of the drive circuit shown in FIG. 1.
Figure 3:
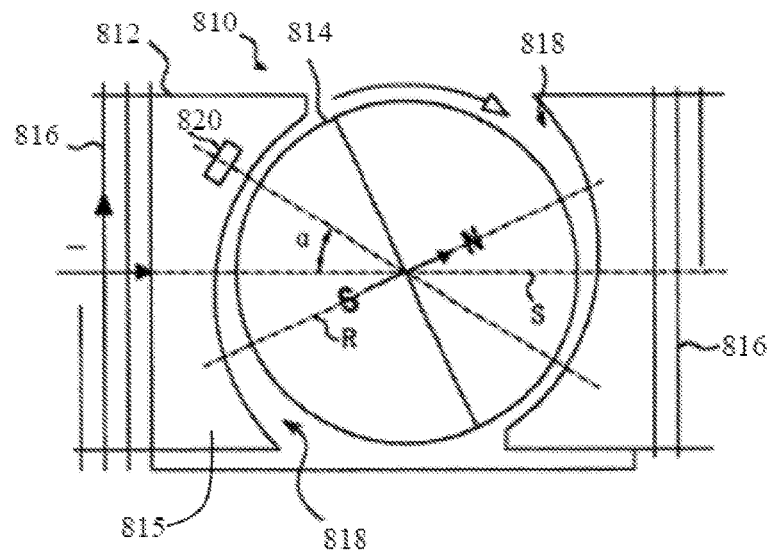
FIG. 3 illustrates a diagrammatic representation of a synchronous motor, according to an embodiment of the present disclosure.

FIG. 3 schematically shows a synchronous motor according to an embodiment of the present invention. The synchronous motor 810 includes a stator 812 and a permanent magnet rotor 814 rotatably disposed between magnetic poles of the stator 812, and the stator 812 includes a stator core 815 and a stator winding 816 wound on the stator core 815. The rotor 814 includes at least one permanent magnet forming at least one pair of permanent magnetic poles with opposite polarities, and the rotor 814 operates at a constant rotational speed of 60 f/p rpm during a steady state phase in a case that the stator winding 816 is connected to an AC power supply, where f is a frequency of the AC power supply and p is the number of pole pairs of the rotor.

Non-uniform gap 818 is formed between the magnetic poles of the stator 812 and the permanent magnetic poles of the rotor 814 so that a polar axis R of the rotor 814 has an angular offset α relative to a central axis S of the stator 812 in a case that the rotor is at rest. The rotor 814 may be configured to have a fixed starting direction (a clockwise direction in this embodiment as shown by the arrow in FIG. 3) every time the stator winding 816 is energized. The stator and the rotor each have two magnetic poles as shown in FIG. 3. It can be understood that, in other embodiments, the stator and the rotor may also have more magnetic poles, such as 4 or 6 magnetic poles.

A position sensor 820 for detecting the angular position of the rotor is disposed on the stator 812 or at a position near the rotor inside the stator, and the position sensor 820 has an angular offset relative to the central axis S of the stator. Preferably, this angular offset is also α, as in this embodiment. Preferably, the position sensor 820 is a Hall effect sensor.

Figure 4:
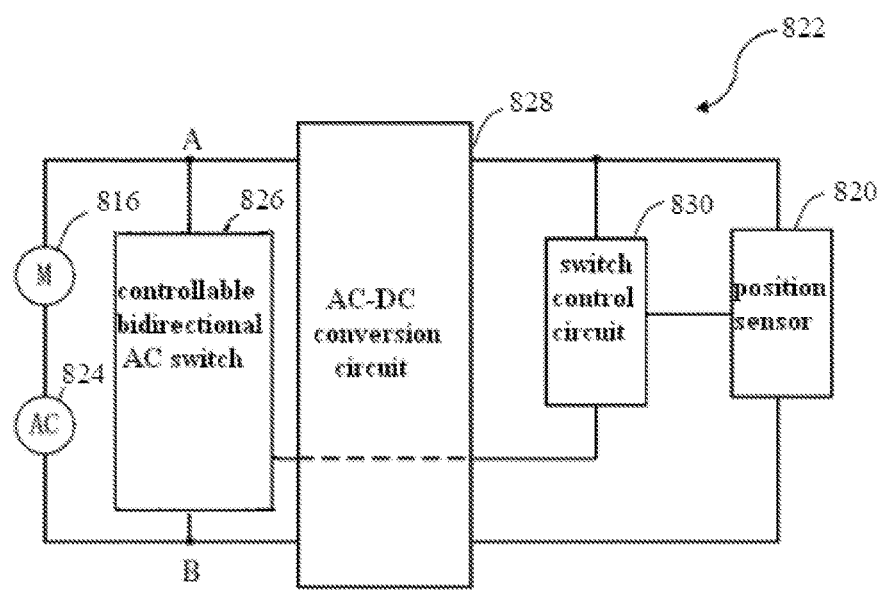
FIG. 4 illustrates a block diagram of a drive circuit for a synchronous motor, according to an embodiment of the present disclosure.

FIG. 4 shows a block diagram of a drive circuit for a synchronous motor according to an embodiment of the present invention. In the drive circuit 822, the stator winding 816 and the AC power supply 824 are connected in series between two nodes A and B. Preferably, the AC power supply 824 may be a commercial AC power supply with a fixed frequency, such as 50 Hz or 60 Hz, and a supply voltage may be, for example, 110V, 220V or 230V. A controllable bidirectional AC switch 826 is connected between the two nodes A and B, in parallel with the stator winding 816 and the AC power supply 824. Preferably, the controllable bidirectional AC switch 826 is a TRIAC, of which two anodes are connected to the two nodes A and B respectively. It can be understood that, the controllable bidirectional AC switch 826 alternatively may be two silicon control rectifiers reversely connected in parallel, and control circuits may be correspondingly configured to control the two silicon control rectifiers in a preset way. An AC-DC conversion circuit 828 is also connected between the two nodes A and B. An AC voltage between the two nodes A and B is converted by the AC-DC conversion circuit 828 into a low voltage DC. The position sensor 820 may be powered by the low voltage DC output by the AC-DC conversion circuit 828, for detecting the magnetic pole position of the permanent magnet rotor 814 of the synchronous motor 810 and outputting a corresponding signal. A switch control circuit 830 is connected to the AC-DC conversion circuit 828, the position sensor 820 and the controllable bidirectional AC switch 826, and is configured to control the controllable bidirectional AC switch 826 to be switched between a switch-on state and a switch-off state in a predetermined way, based on the magnetic pole position of the permanent magnet rotor which is detected by the position sensor and polarity information of the AC power supply 824 which may be obtained from the AC-DC conversion circuit 828, such that the stator winding 816 urges the rotor 814 to rotate only in the above-mentioned fixed starting direction during a starting phase of the motor. According to this embodiment of the present invention, in a case that the controllable bidirectional AC switch 826 is switched on, the two nodes A and B are shorted, the AC-DC conversion circuit 828 does not consume electric energy since there is no current flowing through the AC-DC conversion circuit 828, hence, the utilization efficiency of electric energy can be improved significantly.

Figure 5:
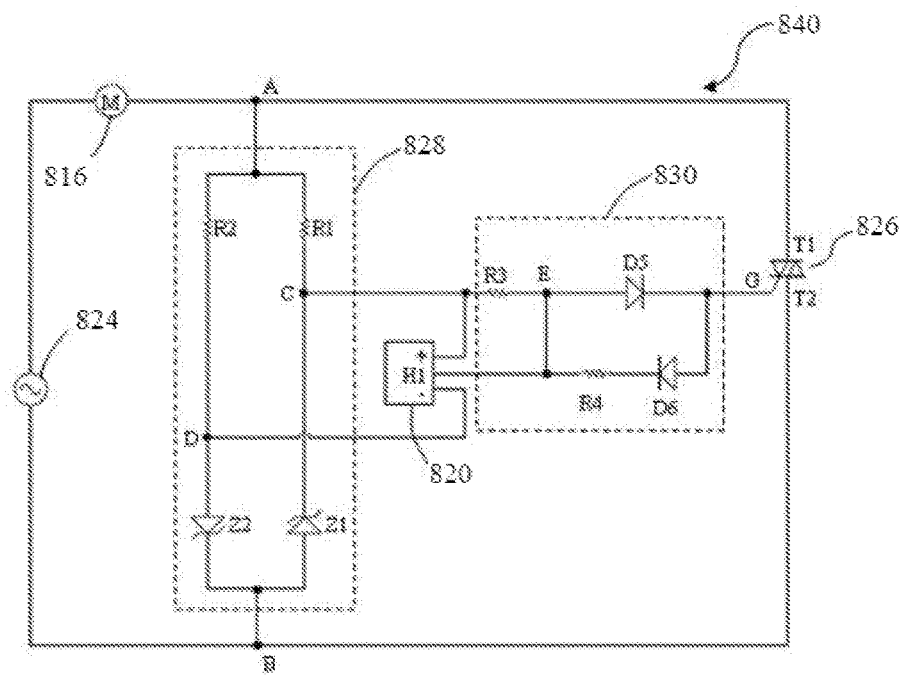
FIG. 5 illustrates a drive circuit for a synchronous motor, according to an embodiment of the present disclosure.

FIG. 5 shows a circuit diagram of a drive circuit 840 for a synchronous motor according to a first embodiment of the present disclosure. The stator winding 816 of the synchronous motor is connected in series with the AC power supply 824 between the two nodes A and B. A first anode T1 of the TRIAC 826 is connected to the node A, and a second anode T2 of the TRIAC 826 is connected to the node B. The AC-DC conversion circuit 828 is connected in parallel with the TRIAC 826 between the two nodes A and B. An AC voltage between the two nodes A and B is converted by the AC-DC conversion circuit 828 into a low voltage DC (preferably, low voltage ranges from 3V to 18V). The AC-DC conversion circuit 828 includes a first zener diode Z1 and a second zener diode Z2 which are reversely connected in parallel between the two nodes A and B via a first resistor R1 and a second resistor R2 respectively. A high voltage output terminal C of the AC-DC conversion circuit 828 is formed at a connection point of the first resistor R1 and a cathode of the first zener diode Z1, and a low voltage output terminal D of the AC-DC conversion circuit 828 is formed at a connection point of the second resistor R2 and an anode of the second zener diode Z2. The voltage output terminal C is connected to a positive power supply terminal of the position sensor 820, and the voltage output terminal D is connected to a negative power supply terminal of the position sensor 820. Three terminals of the switch control circuit 830 are connected to the high voltage output terminal C of the AC-DC conversion circuit 828, an output terminal H1 of the position sensor 820 and a control electrode G of the TRIAC 826 respectively. The switch control circuit 830 includes a third resistor R3, a fifth diode D5, and a fourth resistor R4 and a sixth diode D6 connected in series between the output terminal HI of the position sensor 820 and the control electrode G of the controllable bidirectional AC switch 826. An anode of the sixth diode D6 is connected to the control electrode G of the controllable bidirectional AC switch 826. One terminal of the third resistor R3 is connected to the high voltage output terminal C of the AC-DC conversion circuit 828, and the other terminal of the third resistor R3 is connected to an anode of the fifth diode D5. A cathode of the fifth diode D5 is connected to the control electrode G of the controllable bidirectional AC switch 826.

Figure 6:
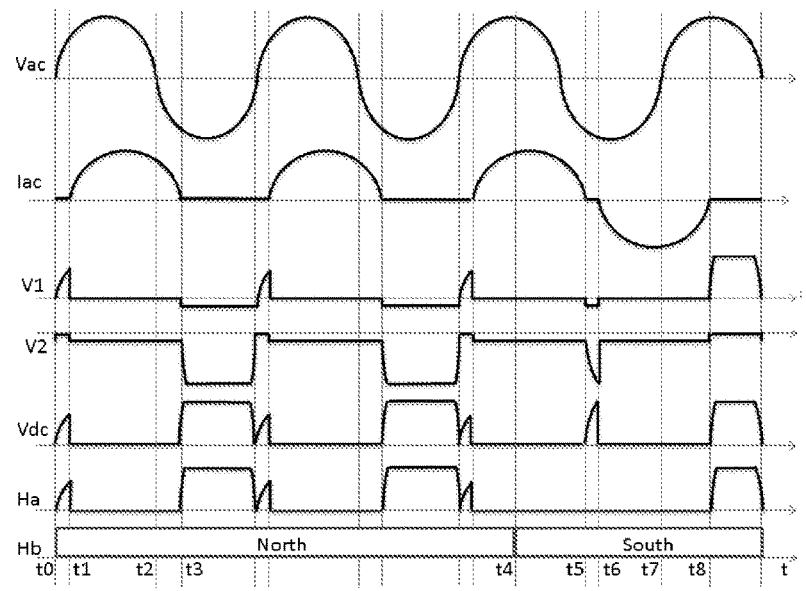
FIG. 6 illustrates a waveform of the drive circuit shown in FIG. 5.

In conjunction with FIG. 6, an operational principle of the drive circuit 840 is described. In FIG. 6, Vac indicates a waveform of voltage of the AC power supply 824, and Iac indicates a waveform of current flowing through the stator winding 816. Due to the inductive character of the stator winding 816, the waveform of current Iac lags behind the waveform of voltage Vac. V1 indicates a waveform of voltage between two terminals of the first zener diode Z1, V2 indicates a waveform of voltage between two terminals of the second zener diode Z2, Vdc indicates a waveform of voltage between two output terminals C and D of the AC-DC conversion circuit 828, Ha indicates a waveform of a signal output by the output terminal H1 of the position sensor 820, and Hb indicates a rotor magnetic field detected by the position sensor 820. In this embodiment, in a case that the position sensor 820 is powered normally, the output terminal HI outputs a logic high level in a case that the detected rotor magnetic field is North, or the output terminal H1 outputs a logic low level in a case that the detected rotor magnetic field is South.

In a case that the rotor magnetic field Hb detected by the position sensor 820 is North, in a first positive half cycle of the AC power supply, the supply voltage is gradually increased from a time instant t0 to a time instant t1, the output terminal H1 of the position sensor 820 outputs a high level, and a current flows through the resistor R1, the resistor R3, the diode D5 and the control electrode G and the second anode T2 of the TRIAC 826 sequentially. The TRIAC 826 is switched on in a case that a drive current flowing through the control electrode G and the second anode T2 is greater than a gate triggering current Ig. Once the TRIAC 826 is switched on, the two nodes A and B are shorted, a current flowing through the stator winding 816 in the motor is gradually increased until a large forward current flows through the stator winding 816 to drive the rotor 814 to rotate clockwise as shown in FIG. 3. Since the two nodes A and B are shorted, there is no current flowing through the AC-DC conversion circuit 28 from the time instant t1 to a time instant t2. Hence, the resistors R1 and R2 do not consume electric energy, and the output of the position sensor 820 is stopped due to no power is supplied. Since the current flowing through two anodes T1 and T2 of the TRIAC 826 is large enough (which is greater than a holding current Ihold), the TRIAC 826 is kept to be switched on in a case that there is no drive current flowing through the control electrode G and the second anode T2. In a negative half cycle of the AC power supply, after a time instant t3, a current flowing through T1 and T2 is less than the holding current Ihold, the TRIAC 826 is switched off, a current begins to flow through the AC-DC conversion circuit 828, and the output terminal HI of the position sensor 820 outputs a high level again. Since a potential at the point C is lower than a potential at the point E, there is no drive current flowing through the control electrode G and the second anode T2 of the TRIAC 826, and the TRIAC 826 is kept to be switched off. Since the resistance of the resistors R1 and R2 in the AC-DC conversion circuit 828 are far greater than the resistance of the stator winding 816 in the motor, a current currently flowing through the stator winding 816 is far less than the current flowing through the stator winding 816 from the time instant t1 to the time instant t2 and generates very small driving force for the rotor 814. Hence, the rotor 814 continues to rotate clockwise due to inertia. In a second positive half cycle of the AC power supply, similar to the first positive half cycle, a current flows through the resistor R1, the resistor R3, the diode D5, and the control electrode G and the second anode T2 of the TRIAC 826 sequentially. The TRIAC 826 is switched on again, and the current flowing through the stator winding 816 continues to drive the rotor 814 to rotate clockwise. Similarly, the resistors R1 and R2 do not consume electric energy since the two nodes A and B are shorted. In the next negative half cycle of the power supply, the current flowing through the two anodes T1 and T2 of the TRIAC 826 is less than the holding current Ihold, the TRIAC 826 is switched off again, and the rotor continues to rotate clockwise due to the effect of inertia.

At a time instant t4, the rotor magnetic field Hb detected by the position sensor 820 changes to be South from North, the AC power supply is still in the positive half cycle and the TRIAC 826 is switched on, the two nodes A and B are shorted, and there is no current flowing through the AC-DC conversion circuit 828. After the AC power supply enters the negative half cycle, the current flowing through the two anodes T1 and T2 of the TRIAC 826 is gradually decreased, and the TRIAC 826 is switched off at a time instant t5. Then the current flows through the second anode T2 and the control electrode G of the TRIAC 826, the diode D6, the resistor R4, the position sensor 820, the resistor R2 and the stator winding 816 sequentially. As the drive current is gradually increased, the TRIAC 826 is switched on again at a time instant t6, the two nodes A and B are shorted again, the resistors RI and R2 do not consume electric energy, and the output of the position sensor 820 is stopped due to no power is supplied. There is a larger reverse current flowing through the stator winding 816, and the rotor 814 continues to be driven clockwise since the rotor magnetic field is South. From the time instant t5 to the time instant t6, the first zener diode Z1 and the second zener diode Z2 are switched on, hence, there is a voltage output between the two output terminals C and D of the AC-DC conversion circuit 828. At a time instant t7, the AC power supply enters the positive half cycle again, the TRIAC 826 is switched off when the current flowing through the TRIAC 826 crosses zero, and then a voltage of the control circuit is gradually increased. As the voltage is gradually increased, a current begins to flow through the AC-DC conversion circuit 828, the output terminal H1 of the position sensor 820 outputs a low level, there is no drive current flowing through the control electrode G and the second anode T2 of the TRIAC 826, hence, the TRIAC 826 is switched off. Since the current flowing through the stator winding 816 is very small, nearly no driving force is generated for the rotor 814. At a time instant t8, the power supply is in the positive half cycle, the position sensor outputs a low level, the TRIAC 826 is kept to be switched off after the current crosses zero, and the rotor continues to rotate clockwise due to inertia. According to an embodiment of the present invention, the rotor may be accelerated to be synchronized with the stator after rotating only one circle after the stator winding is energized.

In the embodiment of the present invention, by taking advantage of a feature of a TRIAC that the TRIAC is kept to be switched on although there is no drive current flowing though the TRIAC once the TRIAC is switched on, it is avoided that a resistor in the AC-DC conversion circuit still consumes electric energy after the TRIAC is switched on, hence, the utilization efficiency of electric energy can be improved significantly.

Figure 7:
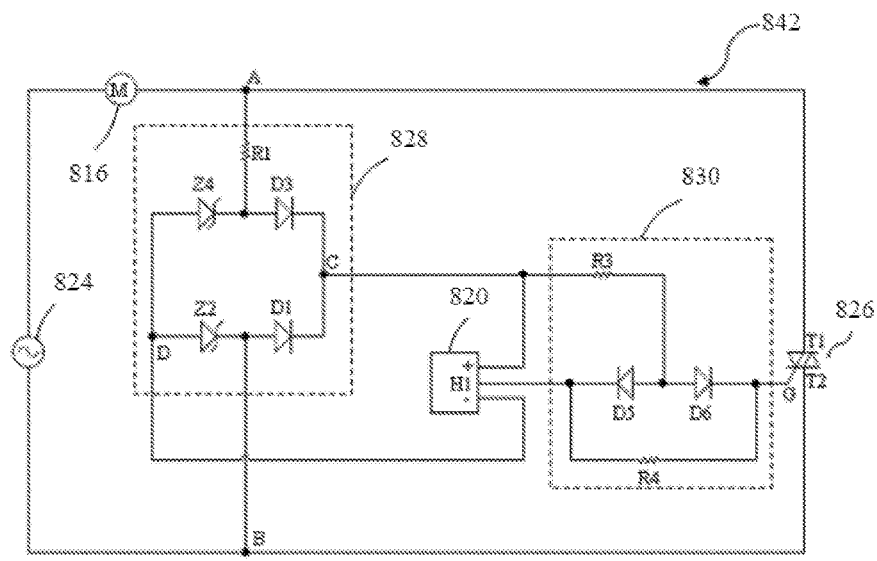
FIGS. 7 to 10 illustrate different embodiments of a drive circuit of a synchronous motor, according to an embodiment of the present disclosure.

FIG. 7 shows a circuit diagram of a drive circuit 842 for a synchronous motor according to an embodiment of the present disclosure. The stator winding 816 of the synchronous motor is connected in series with the AC power supply 824 between the two nodes A and B. A first anode T1 of the TRIAC 826 is connected to the node A, and a second anode T2 of the TRIAC 826 is connected to the node B. The AC-DC conversion circuit 828 is connected in parallel with the TRIAC 826 between the two nodes A and B. An AC between the two nodes A and B is converted by the AC-DC conversion circuit 828 into a low voltage DC, preferably, a low voltage ranging from 3V to 18V. The AC-DC conversion circuit 828 includes a first resistor R1 and a full wave bridge rectifier connected in series between the two nodes A and B. The full wave bridge rectifier includes two rectifier branches connected in parallel, one of the two rectifier branches includes a first diode D1 and a third diode D3 reversely connected in series, and the other of the two rectifier branches includes a second zener diode Z2 and a fourth zener diode Z4 reversely connected in series, the high voltage output terminal C of the AC-DC conversion circuit 828 is formed at a connection point of a cathode of the first diode D1 and a cathode of the third diode D3, and the low voltage output terminal D of the AC-DC conversion circuit 828 is formed at a connection point of an anode of the second zener diode Z2 and an anode of the fourth zener diode Z4. The output terminal C is connected to a positive power supply terminal of the position sensor 820, and the output terminal D is connected to a negative power supply terminal of the position sensor 820. The switch control circuit 30 includes a third resistor R3, a fourth resistor R4, and a fifth diode D5 and a sixth diode D6 reversely connected in series between the output terminal H1 of the position sensor 820 and the control electrode G of the controllable bidirectional AC switch 826. A cathode of the fifth diode D5 is connected to the output terminal H1 of the position sensor, and a cathode of the sixth diode D6 is connected to the control electrode G of the controllable bidirectional AC switch. One terminal of the third resistor R3 is connected to the high voltage output terminal C of the AC-DC conversion circuit, and the other terminal of the third resistor R3 is connected to a connection point of an anode of the fifth diode D5 and an anode of the sixth diode D6. Two terminals of the fourth resistor R4 are connected to a cathode of the fifth diode D5 and a cathode of the sixth diode D6 respectively.

Figure 8:
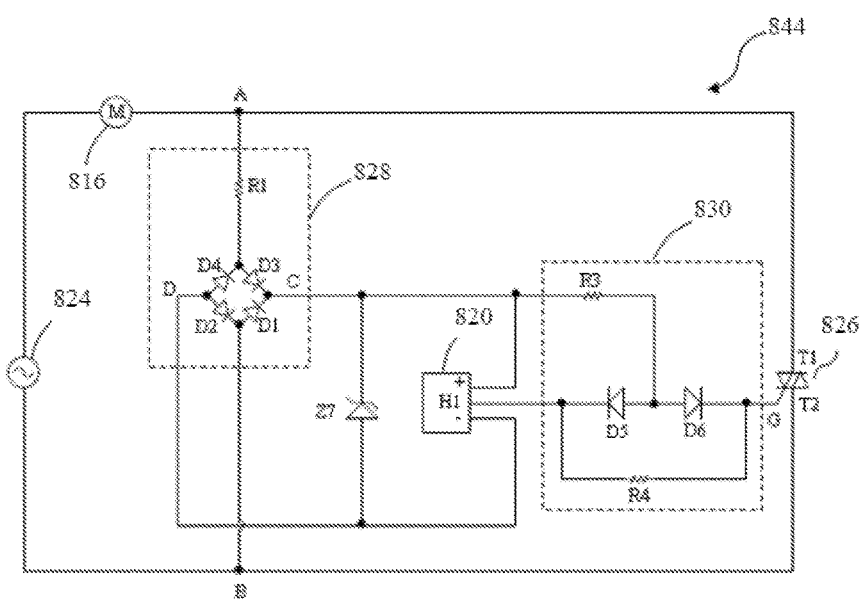

FIG. 8 shows a circuit diagram of a drive circuit 844 for a synchronous motor according to a further embodiment of the present invention. The drive circuit 844 is similar to the drive circuit 842 in the previous embodiment and, the drive circuit 844 differs from the drive circuit 842 in that, the zener diodes Z2 and Z4 in the drive circuit 842 are replaced by general diodes D2 and D4 in the rectifier of the drive circuit 844. In addition, a zener diode Z7 is connected between the two output terminals C and D of the AC-DC conversion circuit 828 in the drive circuit 844.

Figure 9:
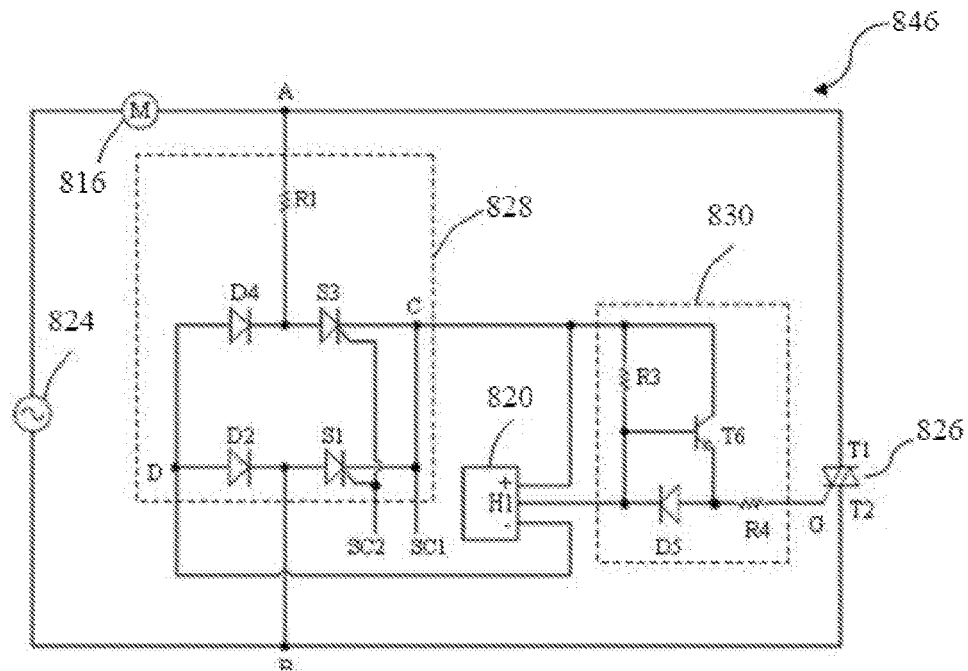

FIG. 9 shows a circuit diagram of a drive circuit 846 for a synchronous motor according to further embodiment of the present invention. The stator winding 816 of the synchronous motor is connected in series with the AC power supply 824 between the two nodes A and B. A first anode Ti of the TRIAC 826 is connected to the node A, and a second anode T2 of the TRIAC 826 is connected to the node B. The AC-DC conversion circuit 828 is connected in parallel with the TRIAC 826 between the two nodes A and B. An AC voltage between the two nodes A and B is converted by the AC-DC conversion circuit 828 into a low voltage DC, preferably, a low voltage ranging from 3V to 18V. The AC-DC conversion circuit 828 includes a first resistor R1 and a full wave bridge rectifier connected in series between the two nodes A and B. The full wave bridge rectifier includes two rectifier branches connected in parallel, one of the two rectifier branches includes two silicon control rectifiers S1 and S3 reversely connected in series, and the other of the two rectifier branches includes a second diode D2 and a fourth diode D4 reversely connected in series. The high voltage output terminal C of the AC-DC conversion circuit 828 is formed at a connection point of a cathode of the silicon control rectifier S1 and a cathode of the silicon control rectifier S3, and the low voltage output terminal D of the AC-DC conversion circuit 828 is formed at a connection point of an anode of the second diode D2 and an anode of the fourth diode D4. The output terminal C is connected to a positive power supply terminal of the position sensor 820, and the output terminal D is connected to a negative power supply terminal of the position sensor 820. The switch control circuit 830 includes a third resistor R3, an NPN transistor T6, and a fourth resistor R4 and a fifth diode D5 connected in series between the output terminal H1 of the position sensor 820 and the control electrode G of the controllable bidirectional AC switch 826. A cathode of the fifth diode D5 is connected to the output terminal H1 of the position sensor. One terminal of the third resistor R3 is connected to the high voltage output terminal C of the AC-DC conversion circuit, and the other terminal of the third resistor R3 is connected to the output terminal H1 of the position sensor. A base of the NPN transistor T6 is connected to the output terminal H1 of the position sensor, an emitter of the NPN transistor T6 is connected to an anode of the fifth diode D5, and a collector of the NPN transistor T6 is connected to the high voltage output terminal C of the AC-DC conversion circuit.

In this embodiment, a reference voltage may be input to the cathodes of the two silicon control rectifiers S1 and S3 via a terminal SC1, and a control signal may be input to control terminals of S1 and S3 via a terminal SC2. The rectifiers S1 and S3 are switched on in a case that the control signal input from the terminal SC2 is a high level, or are switched off in a case that the control signal input from the terminal SC2 is a low level. Based on the configuration, the rectifiers S1 and S3 may be switched between a switch-on state and a switch-off state in a preset way by inputting the high level from the terminal SC2 in a case that the drive circuit operates normally. The rectifiers S1 and S3 are switched off by changing the control signal input from the terminal SC2 from the high level to the low level in a case that the drive circuit fails. In this case, the TRIAC 826, the conversion circuit 828 and the position sensor 820 are switched off, to ensure the whole circuit to be in a zero-power state.

Figure 10:
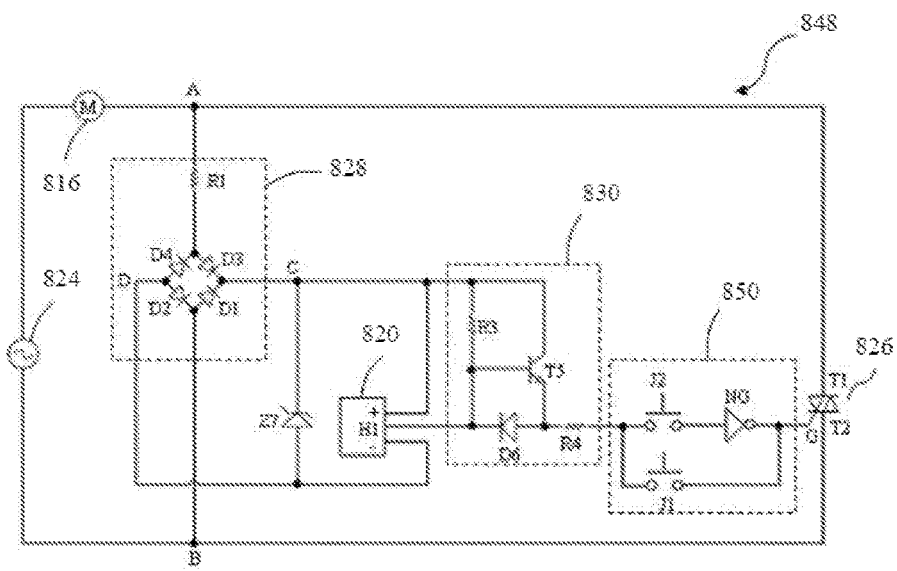

FIG. 10 shows a circuit diagram of a drive circuit 848 for a synchronous motor according to another embodiment of the present invention. The drive circuit 848 is similar to the drive circuit 846 in the previous embodiment and, the drive circuit 848 differs from the drive circuit 846 in that, the silicon control diodes S1 and S3 in the drive circuit 846 are replaced by general diodes D1 and D3 in the rectifier of the drive circuit 848, and a zener diode Z7 is connected between the two terminals C and D of the AC-DC conversion circuit 828. In addition, in the drive circuit 848 according to the embodiment, a preset steering circuit 850 is disposed between the switch control circuit 30 and the TRIAC 826. The preset steering circuit 850 includes a first jumper switch J1, a second jumper J2 switch and an inverter NG connected in series with the second jumper switch J2. Similar to the drive circuit 846, in this embodiment, the switch control circuit 830 includes the resistor R3, the resistor R4, the NPN transistor T5 and the diode D6. One terminal of the resistor R4 is connected to a connection point of an emitter of the transistor T5 and an anode of the diode D6, and the other terminal of the resistor R4 is connected to one terminal of the first jumper switch J1, and the other terminal of the first jumper switch J1 is connected to the control electrode G of the TRIAC 826, and the second jumper switch J2 and the inverter NG connected in series are connected across two terminals of the first jumper switch J1. In this embodiment, when the first jumper switch J1 is switched on and the second jumper switch J2 is switched off, similar to the above embodiments, the rotor 814 still starts clockwise; when the second jumper switch J2 is switched on and the first jumper switch J1 is switched off, the rotor 814 starts counterclockwise. In this case, a starting direction of the rotor in the motor may be selected by selecting one of the two jumper switches to be switched on and the other to be switched off. Therefore, in a case that a driving motor is needed to be supplied for different applications having opposite rotational directions, it is just needed to select one of the two jumper switches J1 and J2 to be switched on and the other to be switched off, and no other changes need to be made to the drive circuit, hence, the drive circuit according to this embodiment has good versatility.

As discussed above, the position sensor 820 is configured for detecting the magnetic pole position of the permanent magnet rotor 814 of the synchronous motor 810 and outputting a corresponding signal. The output signal from the position sensor 820 represents some characteristics of the magnetic pole position such as the polarity of the magnetic field associated with the magnetic pole position of the permanent magnet rotor 814 of the synchronous motor 810. The detected magnetic pole position is then used, by the switch control circuit 830, control the controllable bidirectional AC switch 824 to be switched between a switch-on state and a switch-off state in a predetermined way, based on, together with the magnetic pole position of the permanent magnet rotor, the polarity information of the AC power supply 824 which may be obtained from the AC-DC conversion circuit 828. It should be appreciated that the switch control circuit 830 and the position sensor 820 can be realized via magnetic sensing. Accordingly, the present disclosure discloses a magnetic sensor integrated circuit for magnetic sensing and control of a motor according to the sensed information.

The magnetic sensor integrated circuit according to the present disclosure includes a magnetic field detecting circuit that can reliably detect a magnetic field and generate a magnetic induction signal indicative of certain characteristics of the magnetic field. The magnetic sensor as disclosed herein also includes an output control circuit that controls the magnetic sensor to operate in a state determined with respect to the polarity of the magnetic field as well as that of an AC power supply. In the case the magnetic sensor integrated circuit is coupled with the bidirectional AC switch, the magnetic sensor integrated circuit can effectively regulate the operation of the motor via the bidirectional AC switch. Further, the magnetic sensor integrated circuit in the present disclosure may be directly connected to a commercial/residential AC power supply with no need for any additional A/D converting equipment. In this way, the present disclosure of the magnetic sensor integrated circuit is suitable to be used in a wide range of applications.

Figure 11:
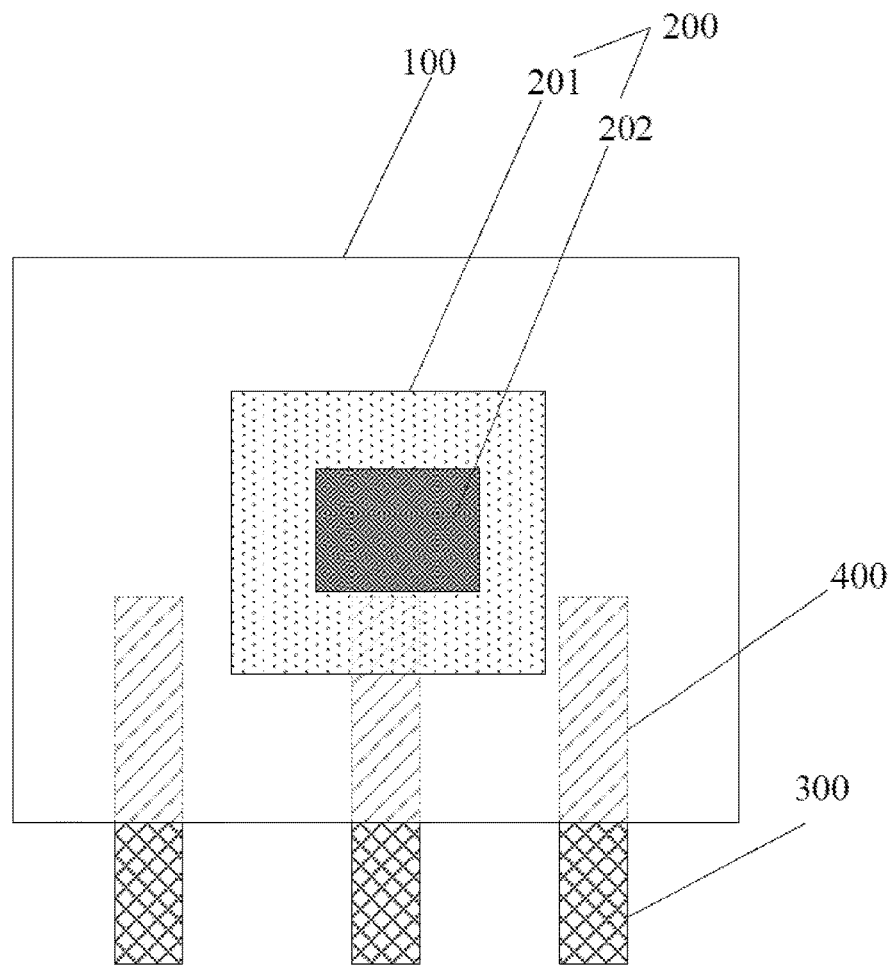
FIG. 11 is a schematic structural diagram of an integrated circuit according to an embodiment of the present disclosure.

As shown in FIG. 11, an integrated circuit is provided according to an embodiment of the present disclosure. The integrated circuit includes a housing 100, an integrated circuit die 200 arranged inside the housing 100 and multiple pins 300 extended out from the housing 100. The integrated circuit die 200 has a conductive back plate 201 and an electronic circuit 202 arranged on the conductive back plate 201. The multiple pins 300 can include, but not limited to, at least one input pin and at least one output pin, each of the multiple pins 300 has a lead frame 400 housed in the housing 100. Furthermore, the conductive back plate 201 is fixed to the lead frame 400 of at least one ungrounded pin of the multiple pins 300 in a manner of electrical insulation.

In at least one embodiment of the present disclosure, the conductive back plate 201 is fixed to the lead frame 400 of one ungrounded pin of the multiple pins 300 in the manner of electrical insulation when the conductive back plate 201 overlaps with the lead frame 400 of one ungrounded pin of the multiple pins 300, in a direction perpendicular to a surface of the integrated circuit. Alternatively, the conductive back plate 201 is fixed to lead frames 400 of more than one ungrounded pin of the multiple pins 300 in the manner of electrical insulation when the conductive back plate 201 overlaps with the lead frames 400 of the more than one ungrounded pin of the multiple pins 300, which is not limited in the present disclosure here, as long as it is ensured that the conductive back plate 201 is fixed to the lead frame 400 of the ungrounded pin in a manner of electrical insulation, where the conductive back plate 201 overlaps with the lead frame 400 of the ungrounded pin.

In at least one embodiment of the present disclosure, the ungrounded pin may either be the input pin or be the output pin. The conductive back plate 201 is fixed to the lead frame 400 of the input pin in the manner of electrical insulation when the ungrounded pin is the input pin. Alternatively, the conductive back plate 201 is fixed to the lead frame 400 of the output pin in the manner of electrical insulation when the ungrounded pin is the output pin. Preferably, the conductive back plate 201 being fixed to the lead frame 400 of at least one of the multiple pins 300 in the manner of electrical insulation includes: a contact surface between the conductive back plate 201 and the lead frame 400 of at least one of the multiple pins 300 is fixed by a non-conductive adhesive.

In any one of the above-described embodiments, the electronic circuit 202 further comprises a floating ground electrically connected to the conductive back plate 201. In at least one embodiment of the present disclosure, the conductive back plate 201 is a substrate layer, and the floating ground is electrically connected to the substrate layer. In another embodiment of the present disclosure, the conductive back plate 201 includes a substrate layer and a metal layer arranged on a side of the substrate layer away from the electronic circuit 202, and the floating ground is electrically connected to the metal layer, which is not limited in the present disclosure here, as the case may be.

Figure 12:
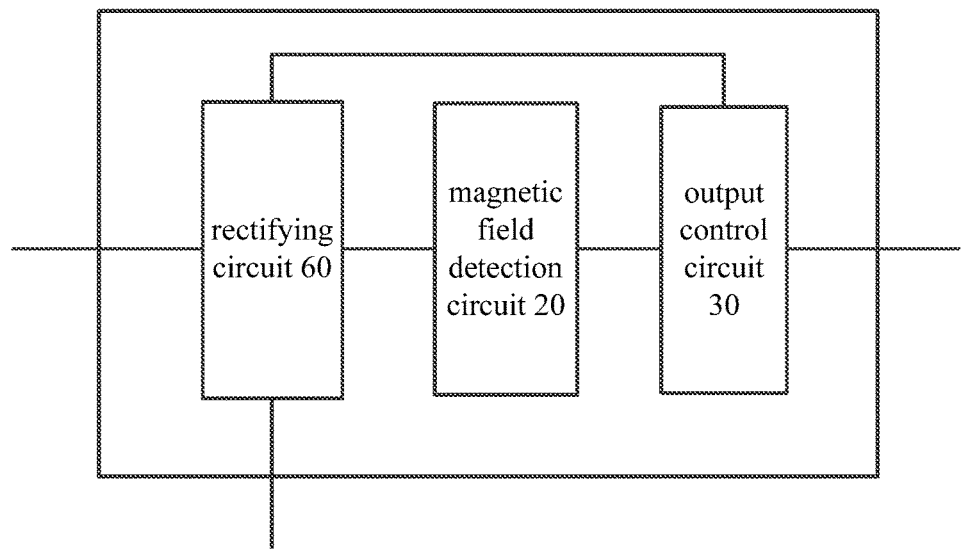
FIG. 12 is a schematic structural diagram of an electronic circuit in an integrated circuit according to an embodiment of the present disclosure.

As shown in FIG. 12, on the basis of any one of the above-described embodiments, in an embodiment of the present disclosure, the electronic circuit 202 has a magnetic field detection circuit 20 configured to detect an external magnetic field and generate magnetic field detection information corresponding to the external magnetic field detected. In at least one embodiment of the present disclosure, the input pin includes a power supply input pin configured to connect an external power supply, the electronic circuit 202 further includes a rectifying circuit 60 connected to the power supply input pin. The rectifying circuit 60 has a first voltage output terminal and a second voltage output terminal. A voltage outputted from the first voltage output terminal is greater than a voltage outputted from the second voltage output terminal, and the second voltage output terminal is the floating ground. That is, the rectifying circuit 60 has a high voltage output terminal and a low voltage output terminal, and the low voltage output terminal is the floating ground terminal.

In at least one embodiment of the present disclosure, the electronic circuit 202 further includes an output control circuit 30 connected to the rectifying circuit 60. The output control circuit 30 is configured to enable, at least based on the magnetic field detection information, the integrated circuit to operate in at least one of a first state in which a load current flows outputted from the output pin and a second state in which a load current flows received by the output pin. Preferably, the load current further flows through the rectifying circuit 60.

Preferably, the output control circuit 30 is configured to enable, at least based on the magnetic field detection information, the integrated circuit to operate in one of the first state in which a load current flows outputted from the output pin and the second state in which a load current flows received by the output pin which are switched with each other. It is worth to note that, in the embodiment of the present disclosure, the integrated circuit operating in one of the first state and the second state which are switched with each other is not limited to a case of switching to another state immediately after one of the first state and the second state finished, and further includes a case of switching to another state when a time spacing passed after one of the first state and the second state finished. In a preferred application example, there is no output at an output port of the integrated circuit during the time spacing at which two states are switched.

In at least one embodiment of the present disclosure, the output control circuit 30 includes a first switch and a second switch. The first switch is connected to the output pin in a first current path, and the second switch is connected to the output pin in a second current path having a direction opposite to a direction of the first current path. And the first switch and the second switch are selectively turned on based on the magnetic field detection information. Preferably, the first switch may be a triode, and the second switch may be a triode or a diode, which is not limited in the present disclosure, as the case may be.

Figure 13:
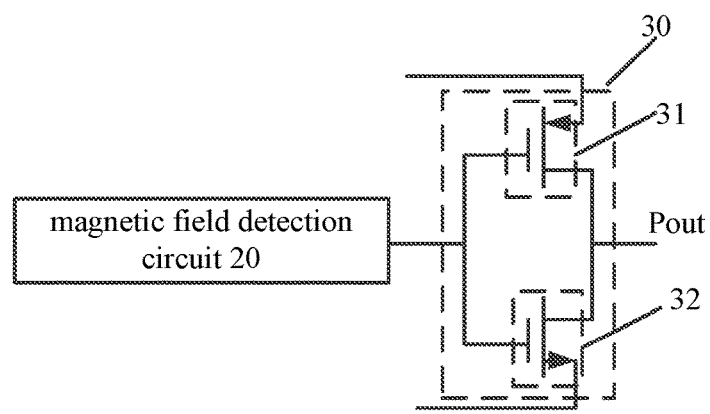
FIG. 13 is a schematic structural diagram of an output control circuit in an integrated circuit according to an embodiment of the present disclosure.

Specifically, as shown in FIG. 13, in at least one embodiment of the present disclosure, the first switch 31 and the second switch 32 are a pair of complementary semiconductor switches. The first switch 31 is turned on at a low level, such as logic 0, and the second switch 32 is turned on at a high level, such as logic 1. The first switch 31 is connected to the output pin Pout in the first current path, and the second switch 32 is connected to the output pin Pout in the second current path. Both a control terminal of the first switch 31 and a control terminal of the second switch 32 are connected to the magnetic field detection circuit 20. A current input terminal of the first switch 31 is connected to a high voltage terminal (such as a DC power supply), a current output terminal of the first switch 31 is connected to a current input terminal of the second switch 32, and a current output terminal of the second switch 32 is connected to a low voltage terminal (such as the ground). The first switch 31 is turned on, the second switch 32 is turned off and the load current flows from the high voltage terminal to an outside of the integrated circuit through the first switch 31 and the output pin Pout, when magnetic field detection information outputted by the magnetic field detection circuit 20 is a low level. The second switch 32 is turned on, the first switch 31 is turned off and the load current flows from the outside of the integrated circuit to the output pin Pout through the second switch 32, when the magnetic field detection information outputted by the magnetic field detection circuit 20 is a high level. Preferably, in an embodiment of the present disclosure, the first switch 31 in the example in FIG. 13 is a positive channel metal oxide semiconductor field effect transistor (P-type MOSFET), and the second switch 32 in the example in FIG. 13 is a negative channel metal oxide semiconductor field effect transistor (N-type MOSFET). It can be understood that, in other embodiments, the first switch and the second switch may also be other type of semiconductor switch such as a junction field effect transistor (JFET), a metal-semiconductor field effect transistor (MESFET) or other field effect transistor, which is not limited in the present disclosure.

Figure 14:
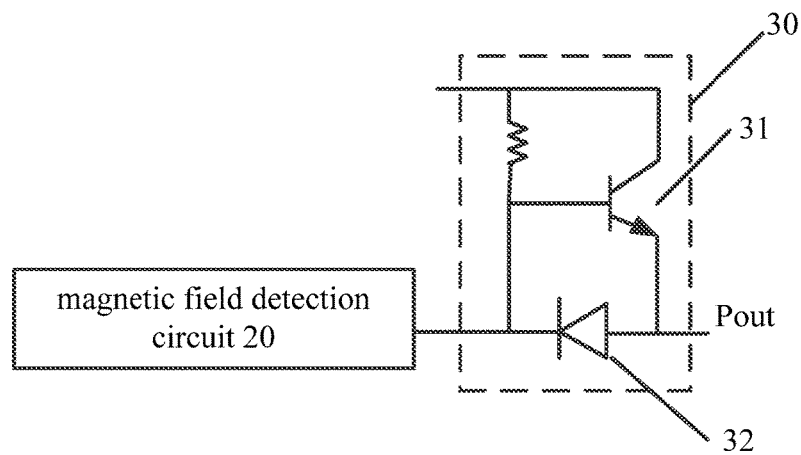
FIG. 14 is a schematic structural diagram of an output control circuit in an integrated circuit according to an embodiment of the present disclosure.

As shown in FIG. 14, in another embodiment of the present disclosure, the first switch 31 is a switch transistor which is turned on at a high level, the second switch 32 is a unidirectional diode, and a control terminal of the first switch 31 and a cathode of the second switch 32 are connected to the magnetic field detection circuit 20. The current input terminal of the first switch 31 is connected to an external power supply, and the current output terminal of the first switch 31 and an anode of the second switch 32 are connected to the output pin Pout. The first switch 31 is connected to the output pin Pout in the first current path, and the output pin Pout, the second switch 32 and the magnetic field detection circuit 20 are connected in the second current path. The first switch 31 is turned on, the second switch 32 is turned off and the load current flows from the external power supply to the outside of the integrated circuit through the first switch 31 and the output pin Pout, when the magnetic field detection information outputted by the magnetic field detection circuit 20 is a high level. The second switch 32 is turned on, the first switch 31 is turned off and the load current flows from the outside of the integrated circuit to the output pin Pout through the second switch 32, when the magnetic field detection information outputted by the magnetic field detection circuit 20 is a low level. It can be understood that, in other embodiments of the present disclosure, the first switch 31 and the second switch 32 may further have other structures, which is not limited in the present disclosure, as the case may be.

In another embodiment of the present disclosure, the output control circuit 30 has a first current path in which a current flows from the output pin to the outside of the integrated circuit, a second current path in which a current flows from the output pin to an inside of the integrated circuit, and a switch connected in one of the first current path and the second current path. The switch is controlled, based on the magnetic field detection information outputted by the magnetic field detection circuit 20, to enable the first current path and the second current path to be selectively turned on. Preferably, the other one of the first current path and the second current path is provided with no switch.

Figure 15:
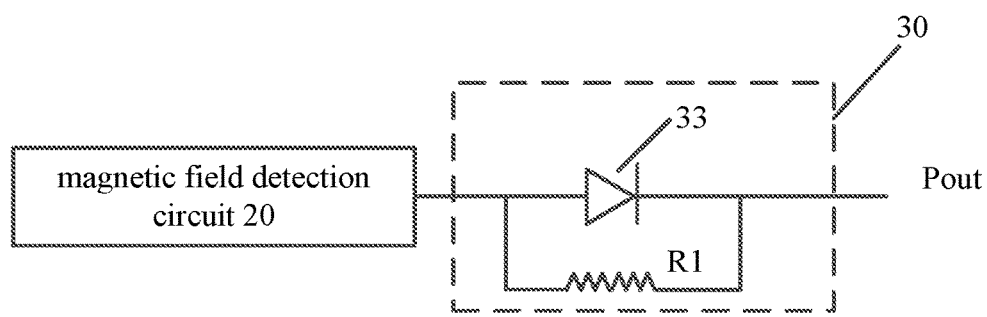
FIG. 15 is a schematic structural diagram of an output control circuit in an integrated circuit according to an embodiment of the present disclosure.

As shown in FIG. 15, the output control circuit 30 includes an unidirectional switch 33, the unidirectional switch 33 is connected to the output pin Pout in the first current path, a current input terminal of the unidirectional switch 33 may be connected to an output terminal of the magnetic field detection circuit 20, and the output terminal of the magnetic field detection circuit 20 may further be connected to the output pin Pout through a resistor R1 in the second current path having a direction opposite to a direction of the first current path. The unidirectional switch 33 is turned on when a magnetic field sensing signal is a high level, the load current flows to the outside of the integrated circuit through the unidirectional switch 33 and the output pin Pout. The unidirectional switch 33 is turned off when the magnetic field sensing signal is a low level, the load current flows from the outside of the integrated circuit to the output pin Pout through the resistor R1 and the magnetic field detection circuit 20. As an alternative, the resistor R1 in the second current path may be replaced with another unidirectional switch connected to the unidirectional switch 33 in reverse-parallel. Thus, there is a balance between the load current flowing from the output pin and the load current flowing into the output pin, which is not limited in the present disclosure.

Figure 15A:
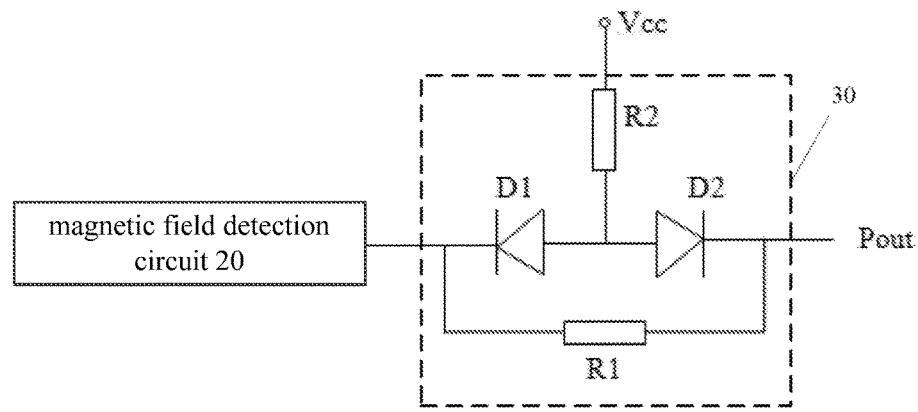
FIG. 15A is a schematic structural diagram of an output control circuit in a magnetic sensor integrated circuit according to an embodiment of the present disclosure.

In another embodiment, as shown in FIG. 15A, the output control circuit 30 includes a diode D1 and a diode D2, a resistor R1 and a resistor R2. The diode D1 and the diode D2 are connected between the output terminal of the magnetic field detection circuit 20 and the output pin Pout in reverse-series. The resistor R1 is connected in parallel with the diode D1 and the diode D2 which are connected in series. The resistor R2 is connected between a common terminal of the diode D1 and the diode D2 and a power supply Vcc, and a cathode of the diode D1 is connected to the output terminal of the magnetic field detection circuit 20. The power supply Vcc is connected to an output terminal of the rectifying circuit 60. The diode D1 is controlled by the magnetic field detection circuit 20. The diode D1 is turned off, the load current flows from the power supply Vcc through the resistor R2 and the diode D2 and flows from the output pin Pout to the outside of the integrated circuit when the magnetic field detection circuit 20 outputs a high level. The load current flows from the outside of the integrated circuit to the output pin Pout through the resistor R1 and the magnetic field detection circuit 20 when the magnetic field detection circuit 20 outputs a low level.

On the basis of any one of the above-described embodiments, in at least one embodiment of the present disclosure, the input pin includes an input pin configured to connect an external AC power supply. The output control circuit 30 enables, based on the magnetic field detection information and a polarity of the AC power supply, the integrated circuit to operate in at least one of the first state and the second state which are switched. Optionally, the magnetic field detection circuit 20 may have a same power supply as the output control circuit 30.

On the basis of the above-described embodiment, in at least one embodiment of the present disclosure, the output control circuit 30 is configured to enable the load current to flow through the output pin when the AC power supply is in a positive half cycle and a polarity of the external magnetic field is detected by the magnetic field detection circuit 20 to be a first polarity or when the AC power supply is in a negative half cycle and the polarity of the external magnetic field is detected by the magnetic field detection circuit 20 to be a second polarity opposite to the first polarity, or to enable no load current to flow through the output pin when the AC power supply is in a positive half cycle and the polarity of the external magnetic field is the second polarity or when the AC power supply is in a negative half cycle and the polarity of the external magnetic field is the first polarity. It is worth to note that, when the AC power supply is in a positive half cycle and a polarity of the external magnetic field is the first polarity, or when the AC power supply is in a negative half cycle and the polarity of the external magnetic field is the second polarity, the load current flowing through the output pin includes a case in which the load current flows through the output pin during a whole time period for the above-described two conditions, and a case in which the load current flows through the output pin during a part time period for the above-described two conditions.

On the basis of the above-described embodiment, in at least one embodiment of the present disclosure, the input pin may include a first input pin and a second input pin configured to connect an external AC power supply. In the present disclosure, the input pin being connected to the external power supply includes a case in which the input pin is connected to two terminals of the external power supply directly, and a case in which the input pin is connected in series with an external load across two terminals of the external power supply, which is not limited in the present disclosure, as the case may be. It should be noted that, in the embodiment of the present disclosure, as shown in FIG. 16, the rectifying circuit 60 is configured to convert an AC signal outputted by the external AC power supply 70 into a DC signal.

Figure 16:
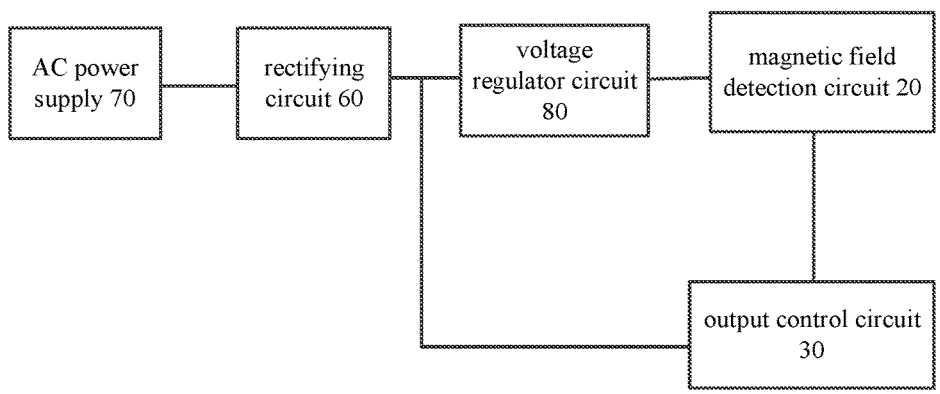
FIG. 16 is a schematic structural diagram of an integrated circuit according to an embodiment of the present disclosure.

On the basis of the above-described embodiment, in a preferred embodiment of the present disclosure, as shown in FIG. 16 continuously, the integrated circuit further includes a voltage regulator circuit 80 arranged between the rectifying circuit 60 and the magnetic field detection circuit 20. The voltage regulator circuit 80 is configured to regulate a first voltage outputted by the rectifying circuit 60 to a second voltage, the second voltage is a supply voltage of the magnetic field detection circuit 20, the first voltage is a supply voltage of the output control circuit 30. A voltage value of the first voltage is greater than a voltage value of the second voltage to reduce the power consumption of the integrated circuit and ensure the integrated circuit to have enough driving capability.

Figure 17:
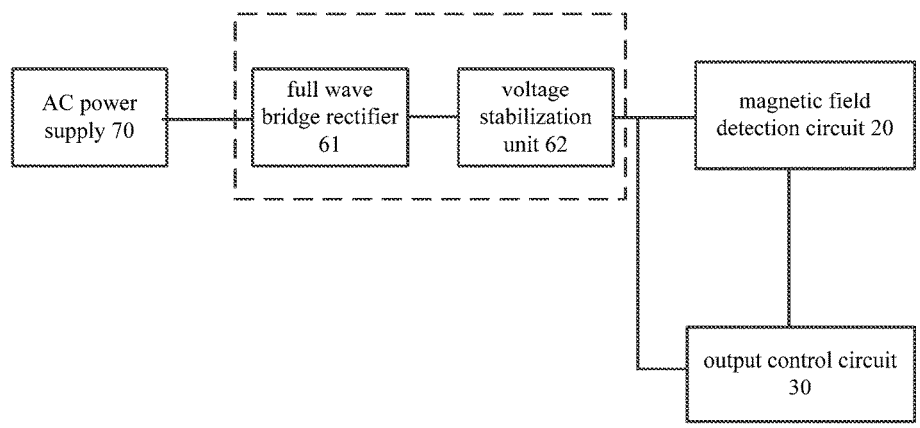
FIG. 17 is a schematic structural diagram of an integrated circuit according to an embodiment of the present disclosure.

On the basis of any one of the above-described embodiments, in a specific embodiment of the present disclosure, as shown in FIG. 17, the rectifying circuit 60 includes a full wave bridge rectifier 61 and a voltage stabilization unit 62 connected to an output terminal of the full wave bridge rectifier 61. The full wave bridge rectifier 61 is configured to convert an AC signal outputted by the AC power supply 70 into a DC signal, and the voltage stabilization unit 62 is configured to stabilize the DC signal outputted by the full wave bridge rectifier 61 to fall within a preset value range.

Figure 18:
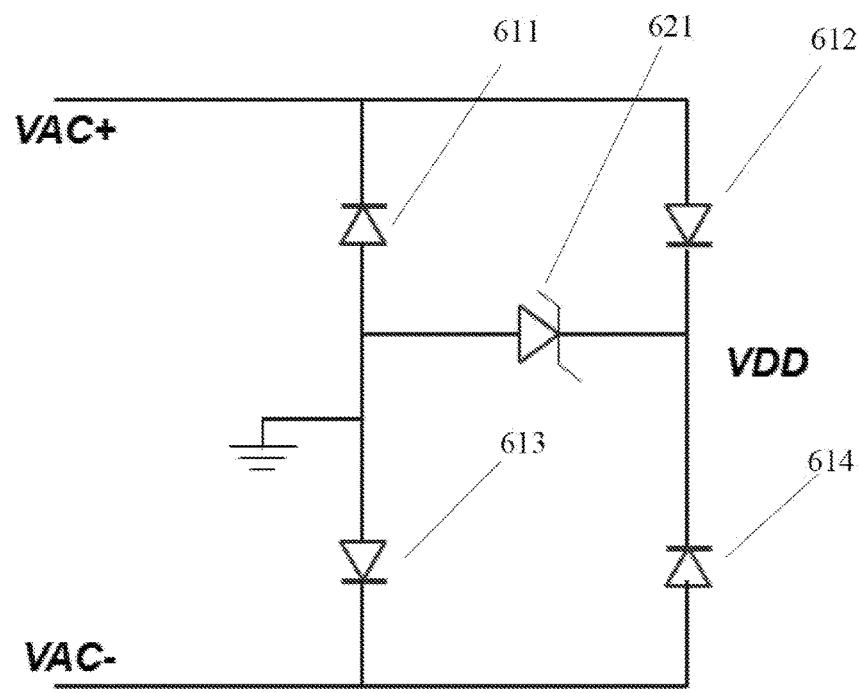
FIG. 18 is a schematic structural diagram of a rectifier circuit in an integrated circuit according to an embodiment of the present disclosure.

FIG. 18 shows a specific circuit of the rectifying circuit 60. The voltage stabilization unit 62 includes a Zener diode 621 connected between two output terminals of the full wave bridge rectifier 61. The full wave bridge rectifier 61 includes a first diode 611 and a second diode 612 connected in series and a third diode 613 and a fourth diode 614 connected in series. A common terminal of the first diode 611 and the second diode 612 is electrically connected to the first input pin VAC+, and a common terminal of the third diode 613 and the fourth diode 614 is electrically connected to the second input pin VAC−.

Specifically, a grounded output terminal of the full wave bridge rectifier is formed by an input terminal of the first diode 611 and an input terminal of the third diode 613 which are electrically connected. A voltage output terminal VDD of the full wave bridge rectifier is formed by an output terminal of the second diode 612 and an output terminal of the fourth diode 614 which are electrically connected. The Zener diode 621 is connected between a common terminal of the second diode 612 and the fourth diode 614 and a common terminal of the first diode 611 and the third diode 613. It should be noted that, in the embodiment of the present disclosure, a power terminal of the output control circuit 30 may be electrically connected to the voltage output terminal of the full wave bridge rectifier 61.

Figure 19:
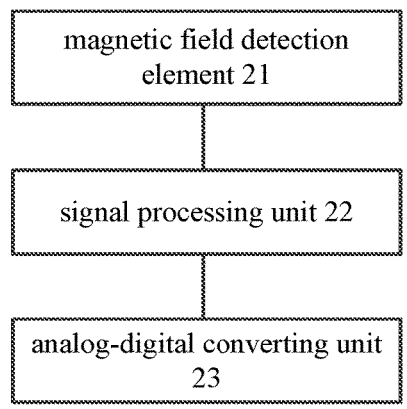
FIG. 19 is a schematic structural diagram of a magnetic field detection circuit in an integrated circuit according to an embodiment of the present disclosure.

On the basis of any one of the above-described embodiments, in at least one embodiment of the present disclosure, as shown in FIG. 19, the magnetic field detection circuit 20 includes: a magnetic field detection element 21 configured to detect and convert the external magnetic field into an electric signal; a signal processing unit 22 configured to amplify and descramble the electric signal; and an analog-digital converting unit 23 configured to convert the amplified and descrambled electric signal into the magnetic field detection information. For an application of only identifying a polarity of the external magnetic field, the magnetic field detection information may be a switch-type digital signal. Preferably, the magnetic field detection element 21 may be a Hall plate.

It should be noted that, in any one of the above-described embodiments, when the input pin includes a first input pin and a second input pin which are configured to connect an external AC power supply, frequencies of occurrence of the first state or the second state is proportional to a frequency of the AC power supply. It can be understood that the present disclosure is not be limited to the embodiment described herein.

Hereinafter, the integrated circuit according to the embodiment of the present disclosure is described in conjunction with a specific application.

Figure 20:
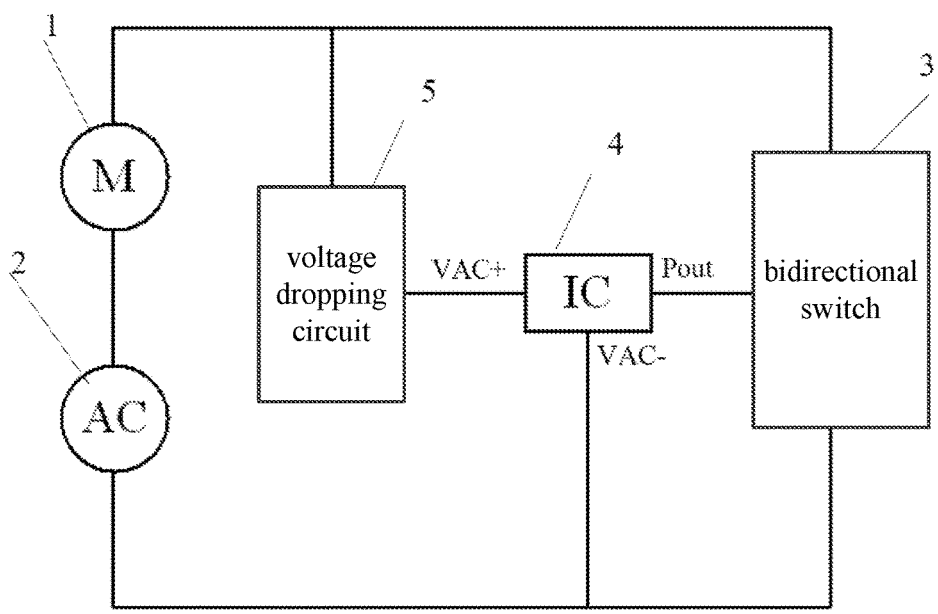
FIG. 20 is a schematic structural diagram of a motor component according to an embodiment of the present disclosure.

A motor component is further provided according to an embodiment of the present disclosure, the motor component includes a motor and a motor-drive circuit, the motor-drive circuit has the integrated circuit according to any one of the above-described embodiments. Specifically, as shown in FIG. 20, the motor component includes: a motor 1 powered by an AC power supply 2; a bidirectional switch 3 connected in series with the motor 1; and the integrated circuit 4 according to any one of the above-described embodiments, where the output pin of the integrated circuit is electrically connected to a control terminal of the bidirectional switch 3. Preferably, the bidirectional switch 3 may be a TRIode AC semiconductor switch (TRIAC). It can be understood that, the bidirectional switch may also be other type of an appropriate switch. For example, the bidirectional switch may include two silicon control rectifiers connected in reverse-parallel, and a respective control circuit is provided, the two silicon control rectifiers are controlled in a preset way based on an output signal of the output port of the integrated circuit by the control circuit.

Preferably, the motor component further includes a voltage dropping circuit 5 for reducing a voltage of the AC power supply 1 and providing the reduced voltage to the integrated circuit 4. The integrated circuit 4 is arranged near a rotor of the motor 1 to sense change in a magnetic field of the rotor.

Figure 21:
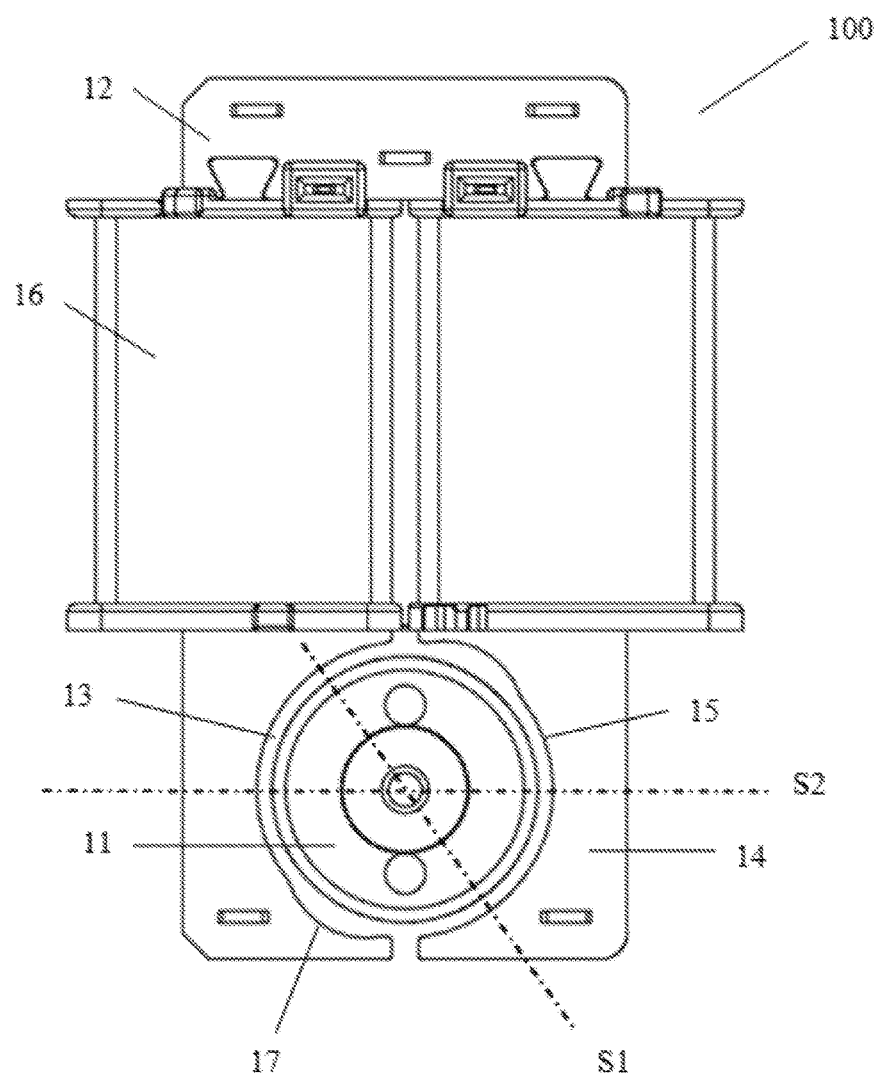
FIG. 21 is a schematic structural diagram of a motor in a motor component according to an embodiment of the present disclosure.

On the basis of the above-described embodiment, in a specific embodiment of the present disclosure, the motor 1 is a synchronous motor. It can be understood that the integrated circuit in the present disclosure is not only applicable to a synchronous motor, but also applicable to other type of a permanent magnetic motor such as a DC brushless motor. As shown in FIG. 21, the synchronous motor includes a stator and a rotor 11 rotatable relative to the stator. The stator includes a stator core 12 and a stator winding 16 wound on the stator core 12. The stator core 12 may be made of soft magnetic materials such as pure iron, cast iron, cast steel, electrical steel, silicon steel. The rotor 11 includes a permanent magnet, the rotor 11 operates at a constant rotational speed of 60 f/p revs/min during a steady state phase when the stator winding 16 is connected in series with an AC power supply, where f is a frequency of the AC power supply and p is the number of pole pairs of the rotor. In the embodiment, the stator core 12 includes two poles 14 opposite to each other. Each of the poles 14 includes a pole arc 15, an outside surface of the rotor 11 is opposite to the pole arc 15, and a substantially uniform air gap is formed between the outside surface of the rotor 11 and the pole arc 15. The "substantially uniform air gap" in the present disclosure means that a uniform air gap is formed in most space between the stator and the rotor, and a non-uniformed air gap is formed in a small part of the space between the stator and the rotor. Preferably, a starting groove 17 which is concave may be disposed in the pole arc 15 of the pole of the stator, and a part of the pole arc 15 rather than the starting groove 17 may be concentric with the rotor. With the configuration described above, the non-uniform magnetic field may be formed, a polar axis S1 of the rotor has an angle of inclination relative to a central axis S2 of the pole of the stator when the rotor is at rest, and the rotor may have a starting torque every time the motor is energized under the action of the integrated circuit. Specifically, the "pole axis S1 of the rotor" refers to a boundary between two magnetic poles having different polarities, and the "central axis S2 of the pole 14 of the stator" refers to a connection line passing central points of the two poles 14 of the stator. In the embodiment, both the stator and the rotor include two magnetic poles. It can be understood that the number of magnetic poles of the stator may not be equal to the number of magnetic poles of the rotor, and the stator and the rotor may have more magnetic poles, such as 4 or 6 magnetic poles in other embodiments.

On the basis of the above-described embodiment, in at least one embodiment of the present disclosure, the output control circuit 30 is configured to enable the bidirectional switch 3 to be turned on when the AC power supply 2 is in a positive half cycle and a polarity of the permanent rotor is detected by the magnetic field detection circuit 20 to be a first polarity or when the AC power supply 2 is in a negative half cycle and the polarity of the permanent rotor is detected by the magnetic field detection circuit 20 to be a second polarity opposite to the first polarity, or to enable the bidirectional switch 3 to be turned off when the AC power supply 2 is in a negative half cycle and the polarity of the permanent rotor is the first polarity or when the AC power supply 2 is in a positive half cycle and the polarity of the permanent rotor is the second polarity.

Preferably, the output control circuit 30 is configured to control a current to flow from the integrated circuit to the bidirectional switch 3 when a signal outputted by the AC power supply 2 is in a positive half cycle and the polarity of the permanent rotor is detected by the magnetic field detection circuit 20 to be the first polarity, or control a current to flow from the bidirectional switch 3 to the integrated circuit when the signal outputted by the AC power supply 2 is in a negative half cycle and the polarity of the permanent rotor is detected by the magnetic field detection circuit 20 to be the second polarity opposite to the first polarity. It can be understood that, when the polarity of the permanent rotor is the first polarity and the AC power supply is in a positive half cycle, or when the polarity of the permanent rotor is the second polarity and the AC power supply is in a negative half cycle, the current flowing from or to the integrated circuit, includes a case in which the current flows through the integrated circuit during a whole time period for the above-described two conditions, and a case in which the current flows through the integrated circuit during a part time period for the above-described two conditions.

In at least one embodiment of the present disclosure, the bidirectional switch 3 is a TRIode AC semiconductor switch (TRIAC), the rectifying circuit 60 is configured to be a circuit as shown in FIG. 18, an output control circuit 30 is configured to be a circuit as shown in FIG. 14, a current input terminal of the first switch 31 in the output control circuit 30 is connected to a voltage output terminal of the full wave bridge rectifier 61, a current output terminal of the second switch 32 is connected to a grounded output terminal of the full wave bridge rectifier 61. When a signal outputted by the AC power supply 2 is in a positive half cycle and the magnetic field detection circuit 20 outputs a low level, the first switch 31 is turned on and the second switch 32 is turned off in the output control circuit 30, a current flows through the AC power supply 2, the motor 1, a first input terminal of the integrated circuit 4, a voltage dropping circuit (not shown in FIG. 14), an output terminal of the second diode 612 of the full wave bridge rectifier 61, the first switch 31 of the output control circuit 30 in the sequence listed, from an output pin to the bidirectional switch 3 and back to the AC power supply 2. After the TRIAC is turned on, a series branch formed by the voltage dropping circuit 5 and the integrated circuit 4 is shorted, and the integrated circuit 4 stops outputting due to no power supply voltage. The TRIAC is still turned on due to a big enough (higher than a maintenance current of the TRIAC) current flowing through two anodes of the TRIAC, when no drive current flows through a control electrode and a first anode of the TRIAC. The first switch 31 is turned off and the second switch 32 is turned on in the output control circuit 30, a current flows from the AC power supply 2 to the output pin through the bidirectional switch 3, and flows through the second switch 32 of the output control circuit 30, a grounded output terminal and the first diode 611 of the full wave bridge rectifier 61, a first input terminal of the integrated circuit 4 and the motor 1 back to the AC power supply 2, when a signal outputted by the AC power supply 2 is in a negative half cycle and the magnetic field detection circuit 20 outputs a high level. Similarly, after the TRIAC is turned on, the integrated circuit 4 stops outputting due to a short circuit, and the TRIAC can still be turned on. When the signal outputted by the AC power supply 2 is in a positive half cycle and the magnetic field detection circuit 20 outputs a high level or when the signal outputted by the AC power supply 2 is in a negative half cycle and the magnetic field detection circuit 20 outputs a low level, both the first switch 31 and the second switch 32 are turned off in the output control circuit 30, and the TRIAC is turned off. Therefore, the output control circuit 30 can enable, based on a polarity of the AC power supply 2 and the magnetic field detection information, the integrated circuit to control the bidirectional switch 3 to be switched between a turn-on state and a turn-off state in a preset way, and then to control an energized mode of the stator winding 16 so that a variation magnetic field generated by the stator fits a position of a magnetic field of the rotor and drags the rotor to rotate in a single direction, thereby enabling the rotor to rotate in a fixed direction every time the motor is energized.

In a motor component according to another embodiment of the present disclosure, the motor may be connected in series with the bidirectional switch across two terminals of the external AC power supply, a first series branch formed by the motor and the bidirectional switch is connected in parallel with a second series branch formed by the voltage dropping circuit and the integrated circuit. The output port of the integrated circuit is connected to the bidirectional switch to control the bidirectional switch to be switched between a turn-on state and a turn-off state in a preset way, and then to control an energized mode of the stator winding.

The motor component in the embodiment of the present disclosure may be applied to, but not limited to, devices such as a pump, a fan, a household appliance or a vehicle. For example, the household appliance may be a washing machine, a dishwasher, a range hood or an exhaust fan.

In a preferred embodiment of the present disclosure, a low voltage terminal of the rectifying circuit 60 is a floating ground, and electrically connected to a conductive back plate of an integrated circuit die. The integrated circuit die may be fixed to a lead frame of an output pin Pout in a manner of electrical insulation by a non-conductive adhesive, thereby avoiding that the output pin Pout and the floating ground are shorted.

In addition, an application device having the motor component according to any one of the above-described embodiments is further provided. Preferably, the application device is a pump, a fan, a household appliance or a vehicle, which is not limited in the present disclosure here, as the case may be.

It can be seen from the above description that, the integrated circuit according to embodiments of the present disclosure includes: a housing, an integrated circuit die arranged inside the housing and multiple pins extended out from the housing. The integrated circuit die has a conductive back plate and an electronic circuit arranged on the conductive back plate. The multiple pins include an input pin and an output pin, each of the multiple pins has a lead frame inside the housing. And the conductive back plate is fixed to the lead frame of at least one ungrounded pin of the multiple pins in a manner of electrical insulation, thereby avoiding a short circuit for the integrated circuit due to an electrical connection between the conductive back plate and the lead frame fixed to the conductive back plate, which resulting the packaged IC being scrapped.

It should be noted that, an application field of the integrated circuit according to the embodiment of the present disclosure is not limited herein, although the embodiments of the present disclosure is explained by taking the integrated circuit being applied to the motor as an example.

It should be noted that, the parts in this specification are described in a progressive way, each of which emphasizes the differences from others, and the same or similar parts among the parts can be referred to each other.

It should be noted that the relationship terminologies such as "first", "second" and the like are only used herein to distinguish one entity or operation from another, rather than to necessitate or imply that an actual relationship or order exists between the entities or operations. Furthermore, terms of "include", "comprise" or any other variants are intended to be non-exclusive. Therefore, a process, method, article or device including multiple elements includes not only the disclosed elements but also other elements that are not clearly enumerated, or also include inherent elements of the process, method, article or device. Unless expressively limited otherwise, the statement "including a . . . " does not exclude the case that other similar elements may exist in the process, method, article or device other than enumerated elements.

The description of the embodiments herein enables those skilled in the art to implement or use the present disclosure. Numerous modifications to the embodiments are apparent to those skilled in the art, and the general principles defined herein can be implemented in other embodiments without deviating from the spirit or scope of the present disclosure. Therefore, the present disclosure may not be limited to the embodiments described herein, but is in accordance with the widest scope consistent with the principles and novel features disclosed herein.

The invention claimed is:

1. An integrated circuit comprising:
a housing,
an integrated circuit die arranged inside the housing, and
a plurality of pins extended out from the housing, wherein the integrated circuit die comprises a conductive back plate and an electronic circuit arranged on the conductive back plate, each of the plurality of pins has a lead frame inside the housing, the plurality of pins comprise at least one output pin and the conductive back plate is fixed to the lead frame of the at least one output pin of the plurality of pins in a manner of electrical insulation.

2. The integrated circuit according to claim 1, wherein the plurality of pins further comprise at least one input pin.

3. The integrated circuit according to claim 1, wherein the conductive back plate is fixed to the lead frame of at least one of the plurality of pins in the manner of electrical insulation by a non-conductive adhesive.

4. The integrated circuit according to claim 1, wherein the electronic circuit has a floating ground electrically connected to the conductive back plate.

5. The integrated circuit according to claim 4, wherein the conductive back plate is a substrate layer and the floating ground is electrically connected to the semiconductor chip.

6. The integrated circuit according to claim 4, wherein the conductive back plate comprises a substrate layer and a metal layer arranged on a side of the substrate layer away from the electronic circuit, and the floating ground is electrically connected to the metal layer.

7. The integrated circuit according to claim 1, wherein the electronic circuit comprises a magnetic field detection circuit configured to detect an external magnetic field and generate magnetic field detection information corresponding to the external magnetic field.

8. The integrated circuit according to claim 7, wherein the plurality of pins comprises a power supply input pin configured to connect an external power supply;
the electronic circuit further comprises a rectifying circuit connected to the power supply input pin, the rectifying circuit has a first voltage output terminal and a second voltage output terminal, an output voltage of the first voltage output terminal is greater than an output voltage of the second voltage output terminal, and the second voltage output terminal is a floating ground.

9. The integrated circuit according to claim 8, wherein the electronic circuit further comprises an output control circuit connected to the rectifying circuit, the output control circuit is configured to enable, at least based on the magnetic field detection information, the integrated circuit to operate in at least one of a first state in which a load current flows outputted from an output pin of the plurality of pins and a second state in which a load current flows received by the output pin of the plurality of pins.

10. The integrated circuit according to claim 9, wherein the output control circuit is configured to enable, at least based on the magnetic field detection information, the integrated circuit to operate in one of the first state in which a load current flows outputted from the output pin and the second state in which a load current flows received by the output pin which are switched with each other.

11. The integrated circuit according to claim 9, wherein the power supply input pin is configured to connect an external AC power supply, the output control circuit is configured to enable, based on the magnetic field detection information and a polarity of the AC power supply, the integrated circuit to operate in at least one of the first state in which a load current flows outputted from the output pin and the second state in which a load current flows received by the output pin.

12. The integrated circuit according to claim 9, wherein the output control circuit comprises a first switch and a second switch, the first switch is connected to the output pin in a first current path, the second switch is connected to the output pin in a second current path having a direction opposite to a direction of the first current path, and the first switch and the second switch are selectively turned on based on the magnetic field detection information.

13. The integrated circuit according to claim 9, wherein the output control circuit has a first current path in which a current flows outputted from the output pin, a second current path in which a current flows received by the output pin, and a switch connected in one of the first current path and the second current path, the switch is controlled, based on the magnetic field detection information outputted by the magnetic field detection circuit, to enable the first current path and the second current path to be selectively turned on.

14. The integrated circuit according to claim 13, wherein the other one of the first current path and the second current path is provided with no switch.

15. A motor component comprising a motor and a motor-drive circuit, wherein the motor-drive circuit comprises the integrated circuit according to claim 1.

16. An application device having the motor component according to claim 15.

17. The application device according to claim 16, wherein the application device is a pump, a fan, a household appliance or a vehicle.

* * * * *